United States Patent [19]

Hoch et al.

[11] 4,332,955

[45] Jun. 1, 1982

[54] PREPARATION OF TRANSPARENT PIGMENTARY FORMS OF 4,4',7,7'-TETRACHLOROTHIOINDIGO

[75] Inventors: Helmut Hoch, Wachenheim; Erwin Hahn, Heidelberg; Heinrich Hiller, Wachenheim, all of Fed. Rep. of Germany

[73] Assignee: BASF Aktiengesellschaft, Ludwigshafen, Fed. Rep. of Germany

[21] Appl. No.: 137,955

[22] Filed: Apr. 7, 1980

[30] Foreign Application Priority Data

Apr. 23, 1979 [DE] Fed. Rep. of Germany ....... 2916400

[51] Int. Cl.³ .......................................... C07D 333/64
[52] U.S. Cl. .................................................... 549/56
[58] Field of Search ......................................... 549/56

[56] References Cited

U.S. PATENT DOCUMENTS

| | | | |
|---|---|---|---|
| 2,044,796 | 6/1936 | Krauss et al. | 549/56 |
| 2,045,475 | 6/1936 | Krauss et al. | 549/56 |
| 2,062,443 | 12/1936 | Carleton et al. | 549/56 |
| 3,752,688 | 8/1973 | Fuchs et al. | 260/314.5 |

FOREIGN PATENT DOCUMENTS

| | | |
|---|---|---|
| 194237 | 5/1905 | Fed. Rep. of Germany . |
| 197162 | 5/1906 | Fed. Rep. of Germany . |
| 241910 | 3/1907 | Fed. Rep. of Germany . |
| 1137156 | 9/1962 | Fed. Rep. of Germany . |
| 918516 | 2/1963 | United Kingdom . |
| 1463229 | 2/1977 | United Kingdom . |
| 1485602 | 9/1977 | United Kingdom . |
| 1497964 | 1/1978 | United Kingdom . |

*Primary Examiner*—Joseph Paul Brust
*Attorney, Agent, or Firm*—Oblon, Fisher, Spivak, McClelland & Maier

[57] ABSTRACT

A transparent pigmentary form of 4,4',7,7'-tetrachlorothioindigo is prepared by oxidizing the leuco compound of tetrachlorothioindigo in aqueous alkaline suspension, in the presence of a dithionite, at from 20° to 100° C., with simultaneous exposure to shearing forces. Preferably, the oxidation is carried out in the presence of a surfactant.

The pigment obtained gives brilliant, transparent full-shade colorations, while white reductions have a deep pure reddish hue.

16 Claims, No Drawings

PREPARATION OF TRANSPARENT PIGMENTARY FORMS OF 4,4',7,7'-TETRACHLOROTHIOINDIGO

The present invention relates to a process for the preparation of transparent pigmentary forms of 4,4',7,7'-tetrachlorothioindigo, which give brilliant and deep colorations.

4,4',7,7'-Tetrachlorothioindigo, hereafter referred to as tetrachlorothioindigo, is a valuable colorant for surface coatings and plastics, because of its great fastness. A plurality of processes of preparing thioindigo and its derivatives have been disclosed. However, in only one case is it known that the products can be employed directly as pigments (German Laid-Open Application DOS No. 2,457,703). For this reason, the patent literature describes not only processes of preparation but also processes for converting crude thioindigo into a pigmentary form.

In general, thioindigo and its derivatives are prepared by oxidizing the corresponding 3-hydroxythionaphthenes. 3-Hydroxy-4,7-dichlorothionaphthene can be obtained from 2,5-dichlorophenylthioglycolic acid by cyclization in chlorosulfonic acid, or via 2,5-dichlorophenylthioglycolic acid chloride by cyclization with aluminum chloride (German Pat. No. 197,162). The oxidation of 3-hydroxythionaphthene can be carried out with sodium polysulfide or with air, iron(III) chloride, potassium ferricyanide or potassium dichromate (German Pat. No. 194,237). According to German Laid-Open Application DOS No. 2,504,935, the oxidation can also be carried out with a peroxydisulfate in aqueous alkaline solution.

According to German Pat. No. 241,910, tetrachlorothioindigo is also obtained directly from 2,5-dichlorophenylthioglycolic acid in chlorosulfonic acid at 35°, without (intermediate) isolation of 3-hydroxy-4,7-dichloro-1-thionaphthene.

German Laid-Open Application DOS No. 2,457,703 describes the direct preparation of a pigmentary form of tetrachlorothioindigo by oxidizing 3-hydroxy-4,7-dichlorothionaphthene with oxygen in an alkaline aqueous or aqueous-organic medium. The pigmentary form thus obtained gives high-hiding, relatively dull and pale colorations.

The crude tetrachlorothioindigo obtained by the other conventional processes must be converted to a tinctorially useful pigmentary form by conditioning, with or without prior purification. Conditioning may be carried out, for example, by milling with salt (German Pat. No. 1,137,156), by reprecipitation from sulfuric acid or chlorosulfonic acid, followed by treatment with an organic solvent (German Laid-Open Application DOS No. 2,504,962) or by milling with large amounts of dispersant (Belgian Pat. No. 591,437). All these processes have the disadvantage that they are involved and therefore expensive, and cause substantial pollution of effluent.

According to German Published Application DAS No. 2,043,820, these disadvantages are supposed to be avoided by milling the crude pigments in aqueous suspension, in the presence of an aqueous base. According to the data in Examples 1 to 4 the comminution of the crude pigment requires 48 hours. The resulting tetrachlorothioindigo pigment is stated to give more transparent colorations in baking finishes, with greater depth and purity of hue, than is the case with the pigmentary form obtained under otherwise identical conditions by milling in the absence of alkali.

It is an object of the present invention to provide a process by which tetrachlorothioindigo can be converted to pigmentary forms which in full-shade colorations exhibit great transparency and brilliance, and in white reductions give a deep color of a pure and redder hue. It is a further object of the invention that this process should consist of simple and cheap synthesis steps and finishing steps.

We have found that this object is achieved and that transparent pigmentary forms of tetrachlorothioindigo are obtained if the leuco compound of tetrachlorothioindigo is oxidized in aqueous alkaline suspension in the presence of a dithionite at from 20° to 100° C., with simultaneous exposure to shearing forces.

The process according to the invention results in pigmentary forms of tetrachlorothioindigo which give brilliant and transparent full-shade colorations, whilst the colorations in a white reduction are deep and pure, and have a reddish hue. In respect of these properties, the products of the present invention are markedly superior to the prior art tetrachlorothioindigo pigments. The pigments obtainable by the novel process are easily dispersible and markedly superior in brilliance, tinctorial strength and transparency to the tetrachlorothioindigo pigment obtainable by the method of German Published Application DAS No. 2,043,820. Furthermore, the pigmentary form obtained in accordance with German Published Application DAS No. 2,043,820 exhibits a substantially bluer hue.

The novel process is in general carried out by oxidizing the leuco compound in an aqueous suspension, which contains an alkali metal dithionite and an alkali metal hydroxide, with simultaneous exposure to shearing forces.

The suspension may be prepared by suspending the isolated leuco compound in an alkaline dithionite solution or directly by vatting tetrachlorothioindigo.

In the former case, the vatting of the thioindigo derivative is carried out in from 20 to 60 parts by weight of water per part by weight of tetrachlorothioindigo.

The amount of alkali metal hydroxide, which is preferably used in the form of sodium hydroxide solution, depends on the amount of dithionite. Where sodium hydroxide is used, the amount is in general from 1 to 2 parts per part of alkali metal dithionite. The required amount of dithionite, which is preferably used in the form of the sodium salt, is from 0.1 to 0.5 parts by weight per part by weight of tetrachlorothioindigo.

The vatting is carried out at from 10° to 80° C., in particular at from 20° to 60° C. The reduction is complete after from 0.15 to 2 hours. At this stage, the leuco compound has precipitated, and is isolated. The aqueous suspension obtained can however also be used direct, but this is not advantageous, because of the large volume of liquid (and, consequently, low space-time yield of the pigmentary form).

Isolating the leuco compound of tetrachlorothioindigo is advantageous if an additional purification of the starting material, for example to remove by-products soluble in the vat, is to be carried out. The material on the filter is then advantageously washed with blank vat at from 20° to 30° C., until the filtrate is only slightly colored. The blank vat used is a solution of from 10 to 20 parts by weight of 50% strength by weight sodium hydroxide solution and 10 parts by weight of sodium dithionite in 1,000 parts by weight of water.

If tetrachlorothioindigo which is sufficiently pure for pigmentary purposes is used as the starting material, the suspension of the leuco compound, obtained on vatting, can be oxidized direct. In that case the tetrachlorothioindigo is advantageously vatted in an aqueous suspension of from 3 to 20, preferably from 5 to 15, % strength by weight, using from 0.1 to 0.5 part by weight of sodium hydroxide and from 0.1 to 0.5 part by weight of sodium dithionite per part by weight of the indigo derivative. The vatting is as a rule complete after from 5 to 30 minutes.

The oxidation of the leuco compound is carried out in an alkaline aqueous medium under the action of shearing forces, preferably in the presence of surfactants. Advantageously, the leuco compound is oxidized in an alkaline aqueous suspension which at the start of the oxidation contains, based on leuco compound, from 0.5 to 50% by weight of alkali metal hydroxide, preferably sodium hydroxide, from 1 to 10, preferably from 2 to 6, % by weight of sodium dithionite and the surfactant or surfactants. The concentration of the leuco compound in the suspension is as a rule from 5 to 15% by weight.

The shearing forces are generated in the aqueous suspension by a grinding medium such as sand, ceramic balls, metal balls or, preferably, glass balls or plastic balls, which are agitated by a high-speed stirrer. Examples of suitable equipment to use are sand mills and bead mills.

In batchwise operation, the amount of grinding medium is as a rule from 10 to 40 parts by weight per part by weight of leuco compound. In continuous operation, from 2 to 3 passages in general suffice to give the tinctorially valuable pigmentary form. In batchwise operation, the reaction is complete after from 3 to 6 hours, at which stage the deeply colored pigmentary form has been obtained. The oxidation can be effected by introducing air during milling or by adding oxidizing agents before or during milling.

Suitable oxidizing agents are atmospheric oxygen, hydrogen peroxide and adducts of hydrogen peroxide with sodium carbonate or sodium borate. If hydrogen peroxide is used as the oxidizing agent, it is advantageously added continuously during the shearing treatment.

Air is the preferred oxidizing agent.

The oxidation is carried out at from 20° to 100° C., preferably from 30° to 80° C.

Advantageous surfactants to use may be non-ionic but especially anionic and cationic surfactants.

The amount of these surfactants is from 0.2 to 20, preferably from 0.5 to 15, % by weight, based on leuco compound.

Examples of non-ionic surfactants are $C_{12}$–$C_{20}$-alkanols, N-(hydroxy-$C_2$–$C_4$-alkyl)-amides and N,N-bis-(hydroxy-$C_2$–$C_4$-alkyl)-amides of $C_{16}$–$C_{20}$-carboxylic acids, and adducts of ethylene oxide with $C_{12}$–$C_{20}$-alkanols, with $C_{12}$–$C_{20}$-fatty acids, with amides, with N-hydroxy-$C_2$–$C_4$-alkylamides and N,N-bis-(hydroxy-$C_2$–$C_4$-alkyl)-amides of $C_{16}$–$C_{20}$-fatty acids, with $C_{12}$–$C_{20}$-alkylamines, with $C_8$–$C_{20}$-alkylphenols and with monoglycerides of fatty acids, the ratio of ethylene oxide to the compound undergoing oxyalkylation being in general from 1:1 to 30:1.

Examples of suitable anionic surfactants are $C_{13}$–$C_{18}$-paraffinsulfonic acids, $C_{13}$–$C_{18}$-paraffindisulfonic acids, di-$C_1$–$C_8$-alkyl sulfosuccinates, sulfonated oleic acid dibutylamide, $C_8$–$C_{18}$-alkylbenzenesulfonic acids, e.g. octyl-, nonyl-, decyl-, tetradecyl-, hexadecyl-, octadecyl- and dodecyl-benzenesulfonic acid, mono- and di-$C_3$–$C_8$-alkyl-naphthalene-2-sulfonic acids, condensation products of naphthalene-2-sulfonic acid and/or $C_1$–$C_4$-alkyl-naphthalenesulfonic acids and formaldehyde, condensation products of phenolsulfonic acids, urea and formaldehyde, N-$C_{12}$–$C_{18}$-alkyl-N-methyl-aminoacetic acids, $C_{16}$–$C_{20}$-fatty acids, abietic acid, rosin, hydrogenated rosin and dimerized rosin, all in the form of the ammonium salts and/or alkali metal salts, or mixtures of the above salts.

Examples of suitable cationic surfactants are quaternary ammonium compounds, such as tri-($C_1$–$C_4$-alkyl)-benzylammonium, di-($C_1$–$C_4$-alkyl)-dibenzylammonium, $C_{10}$–$C_{20}$-alkyl-tri-($C_1$–$C_4$-alkyl)-ammonium and di-($C_{10}$–$C_{20}$-alkyl)-di-($C_1$–$C_4$-alkyl)-ammonium salts, salts of quaternary tri-($C_1$–$C_8$-alkyl)-ammonium polyglycol ethers, e.g. quaternized oxyethylated triethanolamine or tripropanolamine, N-$C_{10}$–$C_{16}$-alkylpyridinium, benzylpyridinium and N-$C_{10}$–$C_{18}$-imidazolinium salts, and mixtures of these ammonium compounds, the salts being chlorides, sulfates, methylsulfates, toluenesulfonates or benzenesulfonates.

Preferred surfactants are abietic acid, rosin, hydrogenated rosin, dimerized rosin, $C_{13}$–$C_{18}$-paraffindisulfonic acids and di-$C_1$–$C_8$-alkyl sulfosuccinates, all in the form of the alkali metal salts or ammonium salts, $C_{10}$–$C_{20}$-alkyl-tri-($C_1$–$C_4$-alkyl)-ammonium salts and N-$C_{10}$–$C_{18}$-alkylimidazolinium salts, the salts being the chlorides, sulfates, methylsulfates, benzenesulfonates or toluenesulfonates, adducts of from 5 to 30 moles of ethylene oxide with 1 mole of $C_{12}$–$C_{20}$-carboxylic acids, adducts of from 3 to 15 moles of ethylene oxide with 1 mole of N-(hydroxy-$C_2$–$C_4$-alkyl)-amides of $C_{16}$–$C_{20}$-carboxylic acids, and mixtures of these agents.

The aqueous alkaline pigment suspension obtained by oxidation is separated from the grinding medium and then rendered neutral or slightly acid (pH 5–7) with an acid, preferably with from 10 to 30% strength by weight hydrochloric acid or sulfuric acid. The pigment is isolated in a conventional manner, for example by filtration or centrifuging, washed and dried. Drying is advantageously carried out under mild conditions, for example under reduced pressure at from 50° to 80° C.

The Examples which follow illustrate the process according to the invention. In the Examples, parts and percentages are by weight.

EXAMPLE 1

30 parts of 4,4',7,7'-tetrachlorothioindigo in the form of the moist aqueous press cake are stirred with 330 parts of water, containing 15 parts of 50% strength sodium hydroxide solution and 10 parts of sodium dithionite, to give a paste. 500 parts of glass beads (diameter 0.8–1 mm) and 3 parts of dimerized rosin in the form of the sodium salt are then added and the suspension is milled by means of a high-speed stirrer (2,000 rpm) for 4 hours at 25°–30°, with access of air. The beads are then removed by sieving. In order to recover colorant still adhering to the glass beads, the latter are resuspended in 600 parts of water and the suspension is filtered off. The combined aqueous colorant suspensions are acidified to pH 5 with 10% strength sulfuric acid and the colorant is filtered off and washed neutral. The press cake is dried under reduced pressure at 70°. The resulting pigment is easily dispersible in baking finishes. Full-shade colorations are reddish violet, with great transparency and brilliance. White reductions are violet and compared to colorations with prior art pigments exhibit a substantially greater depth of color and purity of hue, the hue also being redder.

EXAMPLE 2

30 parts of 4,4′,7,7′-tetrachlorothioindigo in the form of the moist aqueous press cake are stirred with 330 parts of water, containing 15 parts of 50% strength sodium hydroxide solution and 10 parts of sodium dithionite, to give a paste. 600 parts of glass beads (diameter 0.8–1 mm) and 3 parts of lauryltrimethylammonium chloride are then added and the suspension is milled by means of a high-speed stirrer (2,000 rpm) for 4 hours at 25°–30°, with access of air. The batch is then worked up as described in Example 1.

The pigment obtained has tinctorial properties corresponding to those of the pigment obtained as described in Example 1.

EXAMPLE 3

The procedure described in Example 2 is followed, except that 3 parts of oleic acid ethanolamide are used as the surfactant. The pigment obtained gives very transparent reddish violet full-shade colorations. White reductions are violet, with a bluer hue, somewhat lower depth of color and somewhat lesser brilliance than colorations obtained with the pigment from Example 1.

EXAMPLE 4

30 parts of the leuco compound of tetrachlorothioindigo, in the form of a moist press cake, are introduced into a mixture of 300 parts of water, 10 parts of 50% strength sodium hydroxide solution and 3 parts of sodium dithionite. 3 parts of rosin soap (sodium salt) and 600 parts of plastic beads (diameter 0.8–1 mm) are added to the suspension, which is then milled by means of a high-speed stirrer (2,000 rpm) for 4 hours at 35°–40°, with access of air. The batch is worked up as described in Example 1. The pigment obtained has tinctorial properties which virtually correspond to those of the pigment obtained as described in Example 1.

EXAMPLE 5

50 parts of 4,4′,7,7′-tetrachlorothioindigo are suspended in 1,500 parts of water. 40 parts of 50% strength sodium hydroxide solution and 20 parts of sodium dithionite are then added and the mixture is stirred for 2 hours at 40° C., whereupon the brownish olive leuco compound precipitates. The latter is filtered off and the filter residue is washed with 1,000 parts of blank vat (a solution of 20 parts of 50% strength sodium hydroxide solution and 10 parts of sodium dithionite in 1,000 parts of water) until the filtrate is pale.

The leuco compound is then stirred with water to form a 10% strength suspension. 5 parts of dimerized rosin (as the sodium salt), 20 parts of 50% strength sodium hydroxide solution, 10 parts of sodium dithionite and 600 parts of plastic beads (diameter 0.8–1 mm) are then added and the mixture is stirred by means of a stirrer (2,000 rpm) for 5 hours at 30° C., with access of air. The beads are removed by sieving and the suspension is worked up as described in Example 1. Yield: 51 parts of a pigment which in its tinctorial properties virtually corresponds to that obtained according to Example 1, but at the same time is faster to solvents.

EXAMPLE 6

30 parts of 4,4′,7,7′-tetrachlorothioindigo in the form of the aqueous press cake are stirred with 330 parts of water, containing 15 parts of 50% strength sodium hydroxide solution and 10 parts of sodium dithionite, to give a paste. After adding 500 parts of glass beads (diameter 0.8–1 mm), the mixture is milled, using a high-speed stirrer (2,000 rpm), for 4 hours at 25°–30°, with access of air. It is then worked up as described in Example 1. 28 parts of a pigment which in white reductions has a bluer hue but in its other properties substantially resembles the pigment obtained according to Example 1, are obtained.

EXAMPLE 7

The procedure followed is as described in Example 1, except that the 3 parts of dimerized rosin are replaced by a mixture of 3 parts of oxyethylated oleic acid (5 moles of ethylene oxide per mole of acid) and 1 part of oxyethylated $C_{16}$-fatty alcohol (30 moles of ethylene oxide per mole of alcohol). 30 parts of a pigment are obtained; in a white reduction, this product gives more bluish colorations, which are about 10% paler, than the pigment of Example 1. The full-shade coloration is somewhat less brilliant than that obtained with the pigment of Example 1.

EXAMPLE 8

The procedure followed is as described in Example 1, except that the exposure to shearing forces is for 3 hours at 60° C. in the presence of atmospheric oxygen. 32 parts of a pigment which substantially corresponds, in tinctorial properties, to the pigment of Example 1, are obtained.

EXAMPLE 9

The leuco compound of 4,4′,7,7′-tetrachlorothioindigo is prepared and isolated as described in Example 5, and is then stirred with water to give a 10% strength paste. 5 parts of dimerized rosin (in the form of the sodium salt), 20 parts of 50% strength sodium hydroxide solution, 2 parts of sodium dithionite and 600 parts of plastic beads (diameter 0.8–1 mm) are added thereto and the batch is milled by means of a high-speed stirrer (2,000 rpm) for 5 hours at 30°, with access of air. The beads are then sieved off and the suspension is worked up as described in Example 1. 51 parts of a pigment are obtained; compared to the pigment of Example 5, this product has only slightly lower tinctorial strength and somewhat reduced brilliance.

EXAMPLE 10

The procedure followed is as described in Example 1, except that the dimerized rosin is replaced by 15 parts of sodium diisobutylnaphthalene-1-sulfonate. 29 parts of a pigment which in its tinctorial properties corresponds to the pigment of Example 1 are obtained.

EXAMPLE 11

The procedure followed is as described in Example 1, except that the rosin is replaced by 3 parts of sodium dodecylbenzenesulfonate. 29 parts of a pigment which in its tinctorial properties substantially corresponds to the pigment of Example 1 are obtained.

EXAMPLE 12

The procedure followed is as described in Example 1, except that the rosin is replaced by 2 parts of an adduct of 9 moles of ethylene oxide with 1 mole of oleic acid ethanolamide. 30 parts of a pigment are obtained; compared to the pigment of Example 1, this product gives colorations which are about 10% paler, somewhat bluer and somewhat less brilliant.

EXAMPLE 13

The procedure followed is as described in Example 2, except that the lauryltrimethylammonium chloride is replaced by 2 parts of dimethyl-dibenzylammonium chloride. 29 parts of a pigment which in its tinctorial properties corresponds to the pigment of Example 2 are obtained.

EXAMPLE 14

The procedure followed is as described in Example 2, except that the lauryltrimethylammonium chloride is replaced by 1 part of an ester mixture of stearic acid and triethanolamine (molar ratio 1:1) quaternized with dimethyl sulfate. 28 parts of a pigment which in its tinctorial properties corresponds to the pigment of Example 2 are obtained.

EXAMPLE 15

The procedure followed is as described in Example 2, except that only 5 parts of sodium dithionite and 8 parts of 50% strength sodium hydroxide solution are used, the batch otherwise being the same. 30 parts of a pigment which in its tinctorial properties substantially corresponds to the pigment of Example 1 are obtained.

We claim:

1. A process for the preparation of a transparent pigmentary form of 4,4',7,7'-tetrachlorothioindigo wherein the leuco compound of tetrachlorothioindigo is oxidized with air, hydrogen peroxide or an adduct of hydrogen peroxide with sodium carbonate or sodium borate in an aqueous suspension which contains from 3 to 20% by weight, based on the suspension, of leuco compound and from 0.5 to 50% by weight of alkali metal hydroxide and from 1 to 10% by weight of sodium dithionite, both based on leuco compound, at from 20° to 100° C., with simultaneous grinding in the presence of a grinding medium until the leuco compound is completely oxidized, and the pigment is isolated.

2. A process as claimed in claim 1, wherein the oxidation is carried out at from 30° to 80° C.

3. A process as claimed in claim 1 or 2, wherein the oxidation is carried out in the presence of from 0.2 to 20% by weight, based on the leuco compound, of one or more surfactants.

4. A process as claimed in claim 1 or 2, wherein the oxidation is carried out in the presence of from 0.5 to 15% by weight, based on leuco compound, of an anionic or cationic surfactant.

5. A process as claimed in claim 3, wherein an aqueous suspension which contains from 5 to 15% by weight of leuco compound, based on suspension, and from 0.5 to 50% by weight of alkali metal hydroxide and from 1 to 10% by weight of sodium dithionite, both based on the leuco compound, is oxidized.

6. A process as claimed in claim 4, wherein an aqueous suspension which contains from 5 to 15% by weight of leuco compound, based on suspension, and from 0.5 to 50% by weight of alkali metal hydroxide and from 1 to 10% by weight of sodium dithionite, both based on the leuco compound, is oxidized.

7. A process as claimed in claim 5, wherein the oxidation is carried out in the presence of $C_{12}$–$C_{20}$-alkanols, N-(hydroxy-$C_2$–$C_4$-alkyl)-amides and N,N-bis-(hydroxy-$C_2$–$C_4$-alkyl)-amides of $C_{16}$–$C_{20}$-carboxylic acids, and adducts of ethylene oxide with $C_{12}$–$C_{20}$-alkanols, with $C_{12}$–$C_{20}$-fatty acids, with amides, with N-hydroxy-$C_2$–$C_4$-alkylamides and N,N-bis-(hydroxy-$C_2$–$C_4$-alkyl)-amides of $C_{16}$–$C_{20}$-fatty acids, with $C_{12}$–$C_{20}$-alkylamines, with $C_8$–$C_{20}$-alkylphenols and with monoglycerides of fatty acids, the ratio of ethylene oxide to the compound undergoing oxyalkylation being from 1:1 to 30:1, $C_{13}$–$C_{18}$-paraffinsulfonic acids, $C_{13}$–$C_{18}$-paraffindisulfonic acids, di-$C_1$–$C_8$-alkyl sulfosuccinates, sulfonated oleic acid dibutylamide, $C_8$–$C_{18}$-alkylbenzenesulfonic acids, mono- and di-$C_3$–$C_8$-alkyl-naphthalene-2-sulfonic acids, condensation products of naphthalene-2-sulfonic acid and/or $C_1$–$C_4$-alkyl-naphthalenesulfonic acids and formaldehyde, condensation products of phenolsulfonic acids, urea and formaldehyde, N-$C_{12}$–$C_{18}$-alkyl-N-methylaminoacetic acids, $C_{16}$–$C_{20}$-fatty acids, abietic acid, rosin, hydrogenated rosin and dimerized rosin, all in the form of the ammonium salts and/or alkali metal salts, or mixtures of these acids, or of tri-($C_1$–$C_4$-alkyl)-benzylammonium, di-($C_1$–$C_4$-alkyl)-dibenzylammonium, $C_{10}$–$C_{20}$-alkyl-tri-($C_1$–$C_4$-alkyl)-ammonium or di-($C_{10}$–$C_{20}$-alkyl)-di-($C_1$–$C_4$-alkyl)-ammonium chlorides, sulfates, methylsulfates, toluenesulfonates or benzenesulfonates, quaternary tri-($C_1$–$C_8$-alkyl)-ammonium polyglycol ether chlorides, sulfates, methylsulfates, toluenesulfonates or benzenesulfonates, N-$C_{10}$–$C_{16}$-alkylpyridinium, benzylpyridinium or N-$C_{10}$–$C_{18}$-imidazolinium chlorides, sulfates, methylsulfates, toluenesulfonates or benzenesulfonates, or mixtures of the above.

8. A process as claimed in claim 5, wherein the oxidation is carried out in the presence of abietic acid, rosin, hydrogenated rosin, dimerized rosin, $C_{13}$–$C_{18}$-paraffindisulfonic acids or di-$C_1$–$C_8$-alkyl sulfosuccinates, all in the form of the alkali metal salts or ammonium salts, of $C_{10}$–$C_{20}$-alkyl-tri-($C_1$–$C_4$-alkyl)-ammonium or N-$C_{10}$–$C_{18}$-alkylminidazolinium chlorides, sulfates, methylsulfates, benzenesulfonates or toluenesulfonates, or of adducts of ethylene oxide with $C_{12}$–$C_{20}$-carboxylic acids (from 5 to 30 moles of ethylene oxide per mole of acid) or with N-(hydroxy-$C_2$–$C_4$-alkyl)-amides of $C_{16}$–$C_{20}$-carboxylic acids (from 3 to 15 moles of ethylene oxide per mole of amide) or of mixtures of these agents.

9. A process as claimed in claim 5, wherein the oxidation is carried out with air or hydrogen peroxide.

10. A process as claimed in claim 6, wherein the oxidation is carried out with air or hydrogen peroxide.

11. A process as claimed in claim 7, wherein the oxidation is carried out with air or hydrogen peroxide.

12. A process as claimed in claim 8, wherein the oxidation is carried out with air or hydrogen peroxide.

13. A process as claimed in claim 6, wherein the oxidation is carried out with air.

14. A process as claimed in claim 7, wherein the oxidation is carried out with air.

15. A process as claimed in claim 8, wherein the oxidation is carried out with air.

16. A process as claimed in claim 1 or 2, wherein the oxidation with simultaneous grinding is carried out for 3 to 6 hours.

* * * * *